US005653131A

United States Patent [19]

Shibata et al.

[11] Patent Number: 5,653,131

[45] Date of Patent: Aug. 5, 1997

[54] KEY SWITCH SYSTEM FOR A VEHICLE

[75] Inventors: Kazumi Shibata; Yoshiaki Hirakata, both of Saitama, Japan

[73] Assignee: Honda Giken Kogyo Kabushiki Kaisha, Tokyo, Japan

[21] Appl. No.: 446,738

[22] PCT Filed: Feb. 3, 1995

[86] PCT No.: PCT/JP95/00142

§ 371 Date: Dec. 21, 1995

§ 102(e) Date: Dec. 21, 1995

[87] PCT Pub. No.: WO95/21309

PCT Pub. Date: Aug. 10, 1995

[30] Foreign Application Priority Data

| | | | |
|---|---|---|---|
| Feb. 3, 1994 | [JP] | Japan | 6-011940 |
| Jan. 23, 1995 | [JP] | Japan | 7-008540 |

[51] Int. Cl.$^6$ .......... B60R 25/02

[52] U.S. Cl. .......... 70/185; 70/186; 70/252; 70/492

[58] Field of Search .......... 70/252, 182–186, 70/DIG. 30, 421, 492, 360

[56] References Cited

U.S. PATENT DOCUMENTS

| | | | |
|---|---|---|---|
| 2,047,966 | 7/1936 | Jacobi | 70/492 |
| 2,123,940 | 7/1938 | Gray | 70/492 |
| 2,155,734 | 4/1939 | Olson | 70/492 X |
| 3,708,032 | 1/1973 | Suzuki | 70/252 X |
| 4,516,415 | 5/1985 | Kobayashi et al. | 70/252 |
| 4,581,909 | 4/1986 | Weber | 70/252 X |
| 4,972,692 | 11/1990 | Morikawa et al. | 70/252 X |
| 5,287,098 | 2/1994 | Janssen | 70/278 X |

*Primary Examiner*—Lloyd A. Gall

*Attorney, Agent, or Firm*—Nikaido, Marmelstein, Murray & Oram LLP

[57] ABSTRACT

In a key switch system for a vehicle, a plurality of tumblers 6 and a pair of cylinder pins engaging tumbler engagement grooves $\mathbf{1_2}$ in an outer cylinder 1 are radially slidably carried in an inner cylinder 2 which is rotatably carried within the outer cylinder 1. If a key K is correctly and deeply inserted into a key hole $\mathbf{2_1}$, the tumblers 6 are disengaged from the tumbler engagement grooves $\mathbf{1_2}$ by a code valley $K_1$ of the key K, and the pair of cylinder pins 8 are disengaged from the tumbler engagement grooves $\mathbf{1_2}$ by a tip end $K_2$ of the key K, thereby permitting the rotation of the inner cylinder 2. If the key K is turned in a state in which it is not correctly and deeply inserted into the key hole $\mathbf{2_1}$, the rotation is restricted by the engagement of the cylinder pins 8 having a high rigidity into the tumbler engagement grooves $\mathbf{1_2}$, thereby preventing a damage to the tumblers 6.

4 Claims, 17 Drawing Sheets

KEY SWITCH SYSTEM FOR A VEHICLE

FIELD OF THE INVENTION

The present invention relates to a key switch system for a vehicle, which is used in a motorcycle, an automotive vehicle or the like for operating a steering lock mechanism and a switch mechanism in operative association with the operation of a cylinder lock.

DESCRIPTION OF THE PRIOR ART

Generally, a key switch system for the vehicle integrally includes a cylinder lock locked and dislocked by the operation of a key, a steering lock mechanism for locking a steering device in operative association with the operation of the cylinder lock, and a switch mechanism for turning ON an ignition circuit in operative association with the operation of the cylinder lock. In general, the cylinder lock includes an inner cylinder rotatably fitted in an outer cylinder. A plurality of tumblers are slidably supported in the inner cylinder to engage tumbler engagement grooves in the outer cylinder.

If a normal or predetermined key is inserted into a key hole in the inner cylinder, all the tumblers are retracted from the tumbler engagement grooves and hence, the inner cylinder can be turned by rotating the key to operate the steering lock mechanism and the switch mechanism. On the other hand, if a key other than the normal key is inserted, any of the tumblers is brought into engagement in the tumbler engagement groove. For this reason, even if the key is turned, the inner cylinder can not be turned and thus, the steering lock mechanism and the switch mechanism can not be operated.

The cylinder lock of the prior art key switch system for the vehicle inhibits the turning of the inner cylinder by engagement of the tumblers in the tumbler engagement grooves and moreover, the tumbler is formed of a plate-like member having a relatively low rigidity. For this reason, there is a problem that if a key other than the normal key is inserted and forcibly turned, the tumblers are damaged.

In order to eliminate such a disadvantage, a key switch system for a vehicle described in Japanese Utility Model Application Laid-open No. 108468/92 is designed such that if a key other than a normal key is inserted, an inner cylinder is axially pushed, whereby a control pin embedded in an outer cylinder is brought into engagement with a rotation arresting portion of a control groove provided in the inner cylinder. Thus, a rotational force of the inner cylinder can be received by the control pin to prevent a damage to the tumblers.

In the key switch system for the vehicle described in the above publication, the turning of the inner cylinder can be restricted by the control pin. However, the rigidity of the control pin is not necessarily sufficient, and it is desirable that a stronger rotation-restricting force is exhibited to prevent a damage to the tumblers.

SUMMARY OF THE INVENTION

Accordingly, it is an object of the present invention to reliably prevent a damage to the tumblers, when the key other than the normal key has been inserted and turned, or when the key has been shallowly inserted and turned.

To achieve the above object, according to the present invention, there is provided a key switch system for a vehicle, comprising: a cylinder lock comprised of an outer cylinder formed in its inner peripheral surface with axially-extending tumbler engagement grooves, an inner cylinder rotatably carried on the inner peripheral surface of the outer cylinder and having an axially extending key hole, and a plurality of tumblers radially slidably carried in the inner cylinder and capable of being engaged into tumbler engagement grooves in the outer cylinder and disengaged from the tumbler engagement grooves by the insertion of a key into the key hole; a steering lock mechanism operated in operative association with the rotation of the inner cylinder of the cylinder lock to lock a steering device; and a switch mechanism operated in operative association with the rotation of the inner cylinder of the cylinder lock to turn ON an ignition circuit; wherein the system further includes a cylinder pin which is radially slidably carried in the inner cylinder to engage the tumbler engagement groove in the outer cylinder and having a rigidity higher than that of the tumbler, and wherein the cylinder pin is disengaged from the tumbler engagement groove by abutment against a tip end of the key completely inserted into the key hole.

With the above construction, even if the key is forcibly turned in a state in which it is not completely inserted, or even if a different key is inserted and forcibly turned, a damage to the tumblers can be prevented by exhibiting a rotation-resisting force by the cylinder pin.

If a pair of the cylinder pins are radially slidably carried in the inner cylinder and biased away from each other by a spring to engage the different tumbler engagement grooves, the rotational force of the inner cylinder can be dispersed to the pair of cylinder pins and the tumbler engagement grooves, thereby exhibiting a larger rotation-resisting force.

If the cylinder pin includes a pin portion engaging the tumbler engagement grooves, an engage portion abutting against the tip end of the key, and a spring support portion for supporting a spring for biasing the pin portion in a direction to engage the tumbler engagement grooves, it is possible to insure the rigidity of the pin portion to prevent a reduction in rotation-resisting force.

If the steering lock mechanism includes a lock means advanced and retreated by the rotation of the inner cylinder to lock the steering device, and a cam means for moving the inner cylinder in an axial direction when the inner cylinder is turned between a locking position and a lock-releasing position, and if the cam means is axially disposed between the cylinder pin and the lock means, an increase in size of the key switch system due to the provision of the cylinder pins can be avoided by effectively utilizing a dead space between the cylinder pins and the lock means.

If the switch mechanism includes a potentiometer adapted to deliver a resistance value corresponding to the amount of rotation of the inner cylinder, and a control means adapted to turn ON an ignition circuit in response to the change in output from the potentiometer with time, the ignition circuit can be turned ON, only when the inner cylinder has been turned by a normal operation.

BRIEF DESCRIPTION OF THE DRAWINGS

FIGS. 1 to 14 illustrate a first embodiment of the present invention, wherein FIG. 1 is a vertical sectional view of a key switch system for a vehicle;

FIG. 2 is an enlarged sectional view taken along a line 2—2 in FIG. 1;

FIG. 4 is a perspective view of a cylinder pin;

FIG. 5 is an enlarged sectional view taken along a line 5—5 in FIG. 11;

FIG. 7 is a sectional view taken along a line 7—7 in FIG. 1;

FIG. 8 is a sectional view taken along a line 8—8 in FIG. 7;

FIG. 9 is a sectional view taken along a line 9—9 in FIG. 1;

FIG. 10 is a view for explaining the operation;

FIG. 11 is a sectional view taken along a line 11—11 in FIG. 7;

FIG. 12 is a diagram of a control system;

FIG. 14 is a flow chart illustrating the operation;

FIGS. 15 to 19 illustrate a second embodiment of the present invention, wherein

FIG. 15 is a side view of a cylinder pin;

FIG. 17 is a view taken along a line 17—17 in FIG. 15;

FIG. 18 is a perspective view of the cylinder pin; and

DESCRIPTION OF THE PREFERRED EMBODIMENTS

Figure 1:
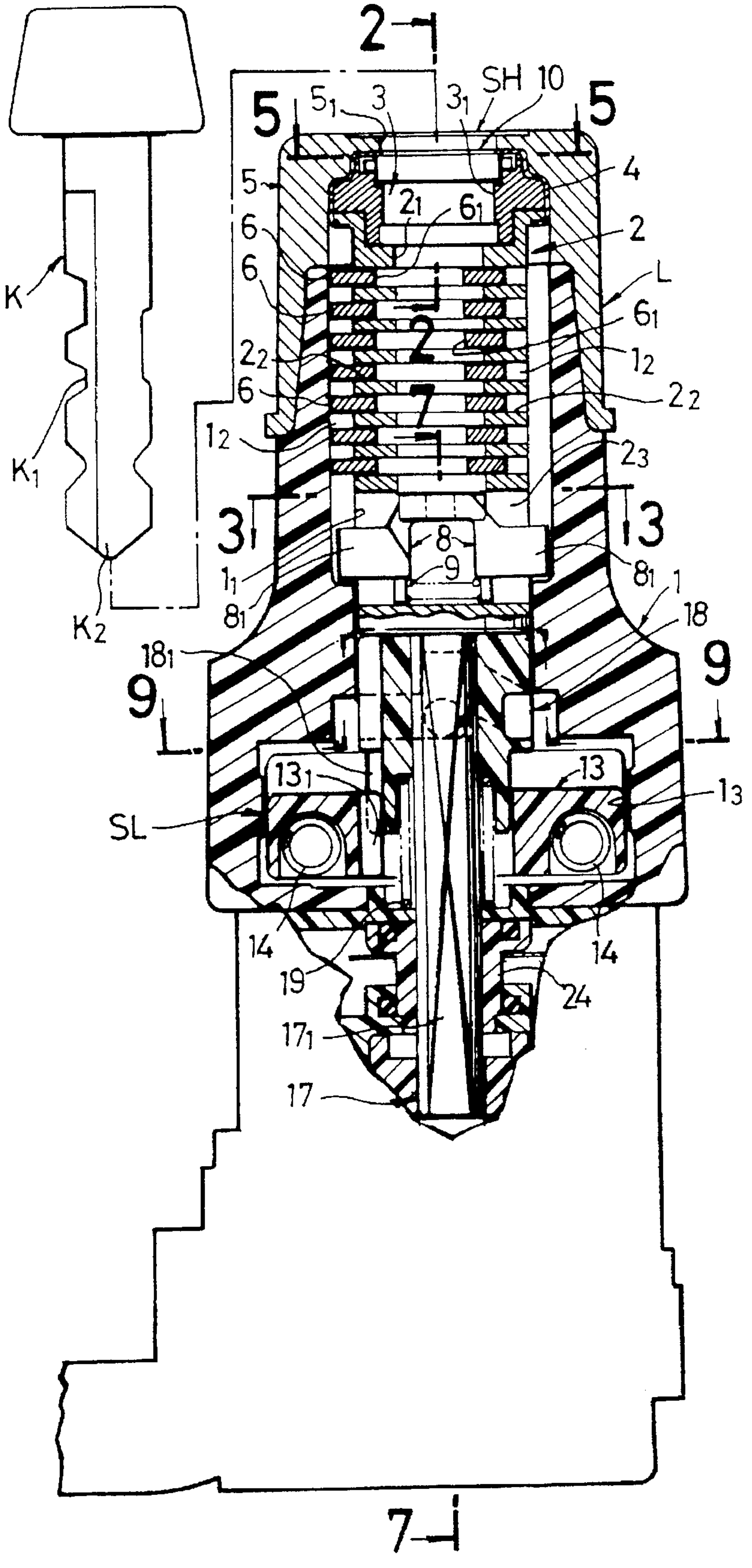
Figure 2:
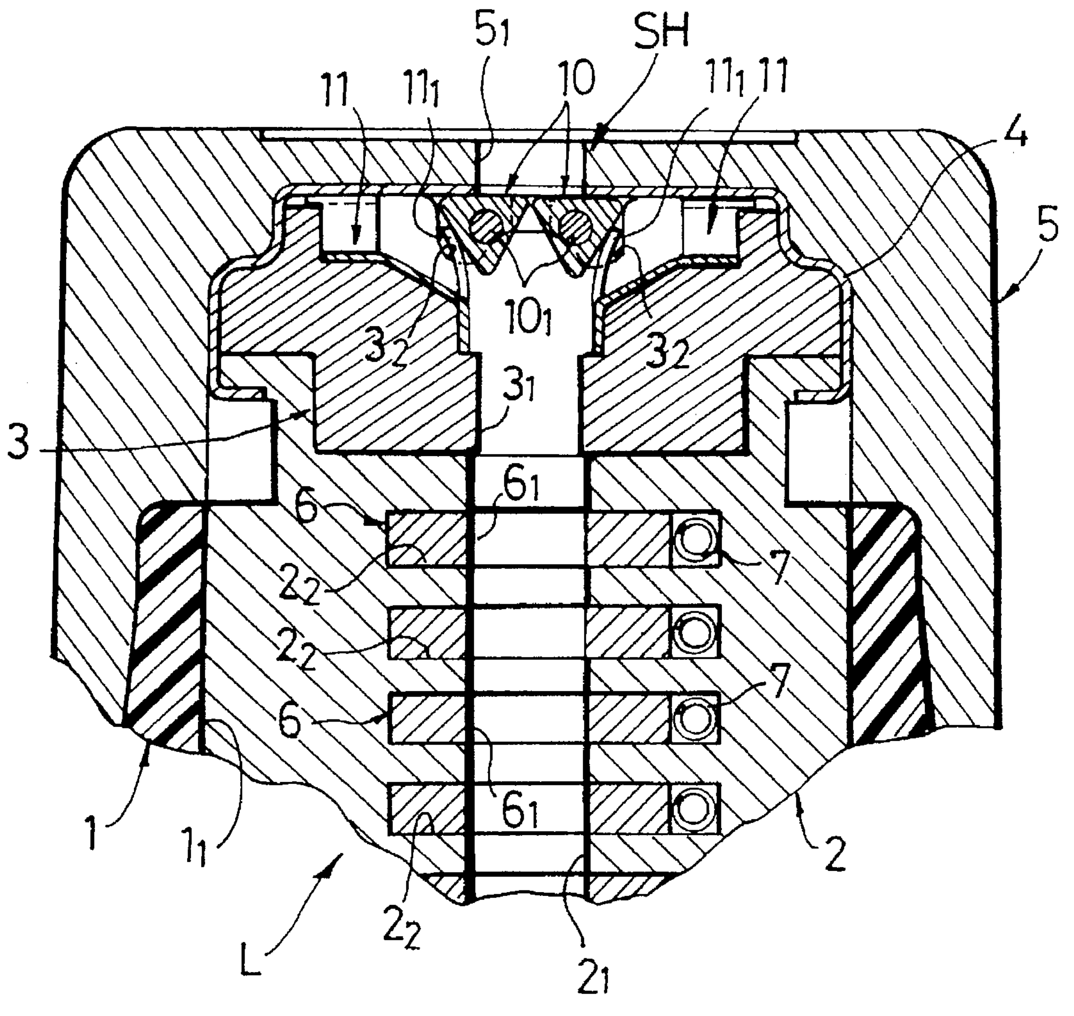
Figure 3A:
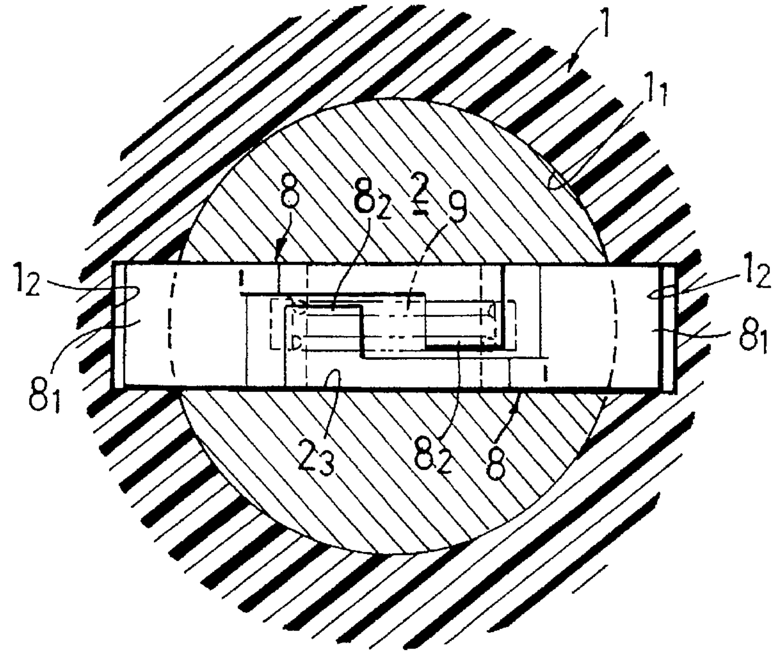
FIGS. 3A and 3B are enlarged sectional view taken along a line 3—3 in FIG. 1.
Figure 3B:
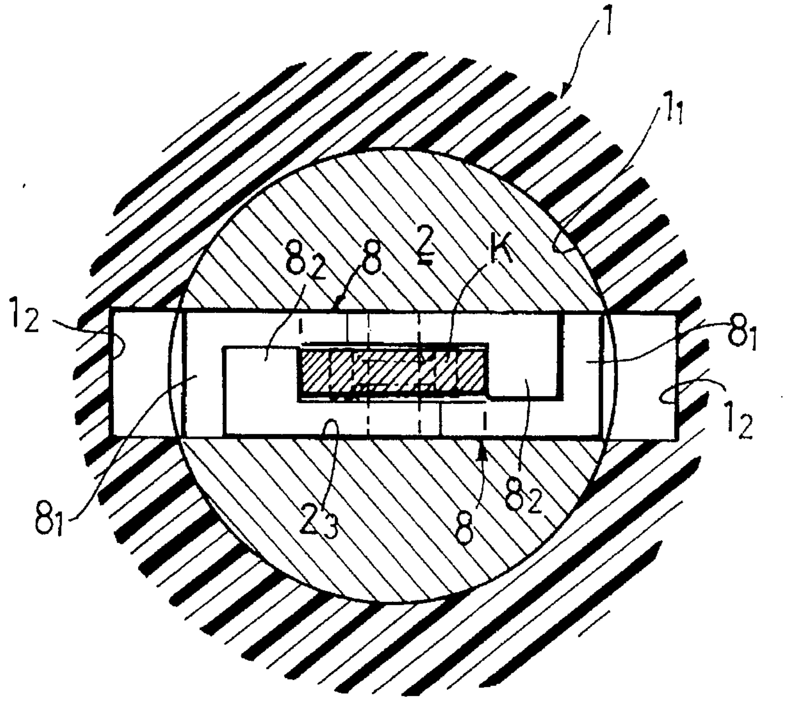
Figure 4:
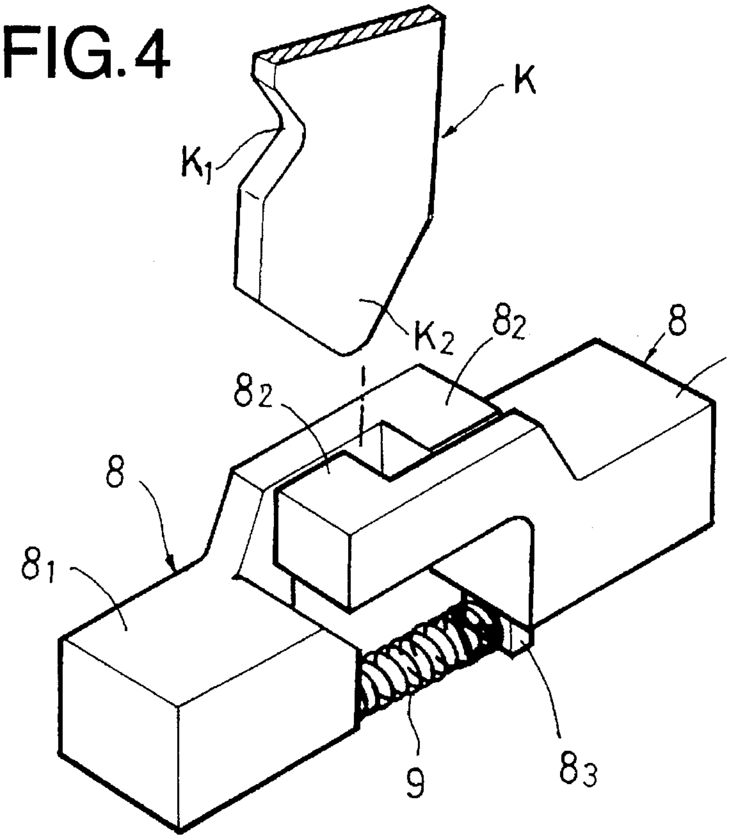

First, the structure of a cylinder lock L of a key switch system for a vehicle will be described with reference to FIGS. 1 to 6.

Referring to FIGS. 1 to 4, the cylinder lock L of the key switch system for the Vehicle includes an outer cylinder 1 having a cylinder bore $1_1$, an inner cylinder 2 axially slidably and relatively rotatably fitted in the cylinder bore $1_1$ in the outer cylinder 1, a cylinder crown 3 fitted in an upper end of the inner cylinder 2, a crown cover 4 which couples the inner cylinder 2 and the cylinder crown 3 to each other by caulking, and a cylinder cap 5 which closes an opening in an upper end of the outer cylinder 1 and has a key insertion opening $5_1$ into which a key K is inserted. The inner cylinder 2 and the cylinder crown 3 have key holes $2_1$ and $3_1$ axially defined therein, respectively, which are communicated with the key insertion opening $5_1$.

A pair of axially extending tumbler engagement grooves $1_2$, $1_2$ are defined in the cylinder bore $1_1$ in the outer cylinder 1, so that they are opposed to each other. On the other hand, seven tumbler slide grooves $2_2$ are defined parallel at predetermined axial distances in the inner cylinder 2 to radially extend therethrough. A tumbler 6 is slidably fitted in each of the tumbler slide grooves $2_2$ and is a substantially rectangular plate-like member, whose opposite ends are engageable into the pair of tumbler engagement grooves $1_2$, $1_2$ in the outer cylinder 1. The number of the tumblers 6 is not limited to seven, and optimally, it is desirable that eight tumblers 6 are provided. When the key K is not inserted into the key hole $2_1$ in the inner cylinder 2, each of the tumblers 6 is biased in one direction by the action of corresponding one of springs 7 (see FIG. 2) and is engaged at one end thereof into the tumbler engagement groove $1_2$ to restrict the rotation of the inner cylinder 2.

A code hole $6_1$ of a predetermined shape is defined in each of the tumblers 6 in line with the key hole $2_1$ in the inner cylinder 2. When a normal key K is inserted into the key holes $2_1$ and $3_1$ through the key insertion opening $5_1$ to reach a predetermined position, code valleys $K_1$ recessedly provided in opposite edges of the key K are engaged into the code holes $6_1$ in the tumblers 6. As a result, the tumblers 6 are slid radially within the tumbler slide grooves $2_2$, so that the opposite ends thereof are disengaged from the tumbler engagement grooves $1_2$, $1_2$. That is, the opposite ends of the tumblers 6 are retracted inwardly from an outer peripheral surface of the inner cylinder 2.

When a key different from the normal key K has been inserted, the rotation of the inner cylinder 2 is restricted by the engagement of the ends of at least one of the tumblers 6 into the tumbler engagement grooves $1_2$, $1_2$.

A pair of left and right cylinder pins 8, 8 for restricting the rotation of the inner cylinder 2 by cooperation with the tumblers 6 are radially slidably carried in a cylinder pin slide groove $2_3$ formed in the inner cylinder 2 to lie below the seven tumblers 6. The cylinder pin 8 includes a pin portion $8_1$ having a rectangular section and engageable into the tumbler engagement groove $1_2$ in the outer cylinder 1, an engage portion $8_2$ capable of abutting against a tip end $K_2$ of the key K, and a spring support portion $8_3$ for supporting one of opposite ends of a spring 9 for biasing both the cylinder pins 8, 8 in a direction away from each other, i.e., in a direction of engagement of the pin portions $8_1$ into the tumbler engagement grooves $1_2$, $1_2$.

Therefore, when the key K is not inserted, the pin portions $8_1$, $8_1$ are in engagement with the tumbler engagement grooves $1_2$, $1_2$ under a resilient force of the spring 9 to restrict the rotation of the inner cylinder 2. When the normal key K has been inserted deeply into the key holes $2_1$ and $3_1$, the engage portions $8_2$, $8_2$ are pushed and opened by the tip end $K_2$ of the key K, thereby causing the pin portions $8_1$, $8_1$ to be disengaged from the tumbler engagement grooves $1_2$, $1_2$ against the resilient force of the spring 9 to permit the rotation of the inner cylinder 2.

When the normal key K has been inserted deeply into the key holes $2_1$ and $3_1$ as described above, the tumblers 6 and the cylinder pins 8, 8 are retracted into the inner cylinder 2 and disengaged from the tumbler engagement grooves $1_2$, $1_2$ in the outer cylinder 1, so that the inner cylinder 2 can be turned by turning the key K. On the other hand, if the key K has been turned in a state in which it is not correctly inserted deeply into the key holes $2_1$ and $3_1$, the rotation of the inner cylinder 2 is restricted, because any of the tumblers 6 and the cylinder pins 8, 8 are in engagement with the tumbler engagement grooves $1_2$, $1_2$.

At that time, a key-turning force is transmitted through the tumblers 6 and the cylinder pins 8, 8 to the outer cylinder 1. However, the rigidity of the block-like cylinder pins 8, 8 is far high, as compared with the rigidity of the plate-like tumblers 6 and hence, the key-turning force is received mainly by the cylinder pins 8, 8, thereby preventing the rotation of the inner cylinder 2 and the damage to the tumblers 6. Therefore, even if the inner cylinder 2 is intended to be accidentally forcibly turned, the cylinder pins 8, 8 having the high rigidity resist to prevent the rotation of the inner cylinder 2 and the damage to the tumblers 6.

By formation of the engage portions $8_2$, $8_2$ and the spring abutment portions $8_3$, $8_3$ with respect to the pin portion as $8_1$, $8_1$ of the cylinder pins 8, 8, the rigidity of the pin portions $8_1$, $8_1$ can sufficiently be insured to exhibit a large rotation-restricting force. Further, it is possible to further increase the rotation-restricting force by the engagement of the two cylinder pins 8, 8 in the different tumbler engagement grooves $1_2$, $1_2$.

Figure 5:
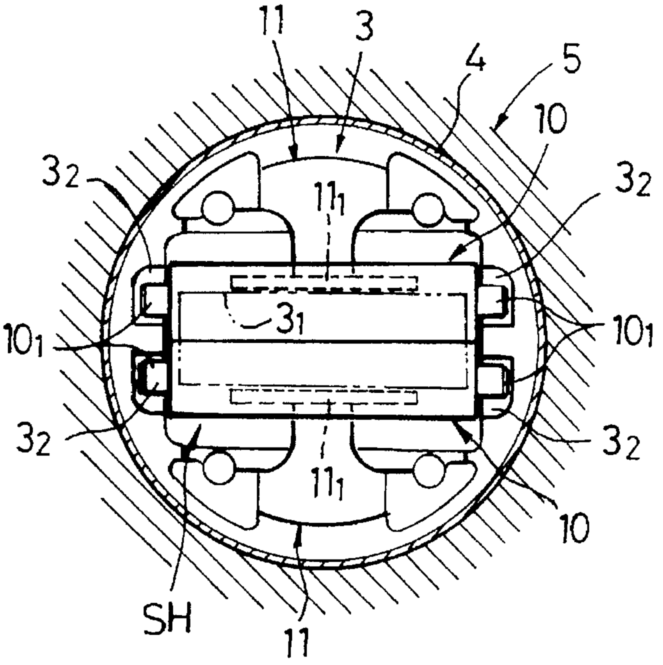

As can be seen from both of FIGS. 5 and 6, a shutter mechanism SH for opening and closing the key hole $3_1$ is provided within the cylinder crown 3. The shutter mechanism SH includes a pair of shutter members 10, 10 formed into a substantially triangular prism shape. Guide pins $\mathbf{10}_1$ are projectingly provided on opposite ends of each of the shutter members 10, 10 and slidably carried on recessed guide surfaces $\mathbf{3}_2$ formed on the cylinder crown 3. A pair of leaf springs 11, 11 are fixed to an upper surface of the cylinder crown 3 and have tongue pieces $\mathbf{11}_1$, $\mathbf{11}_1$ which abut against the shutter members 10, 10 to bias them toward each other.

Figure 6A:
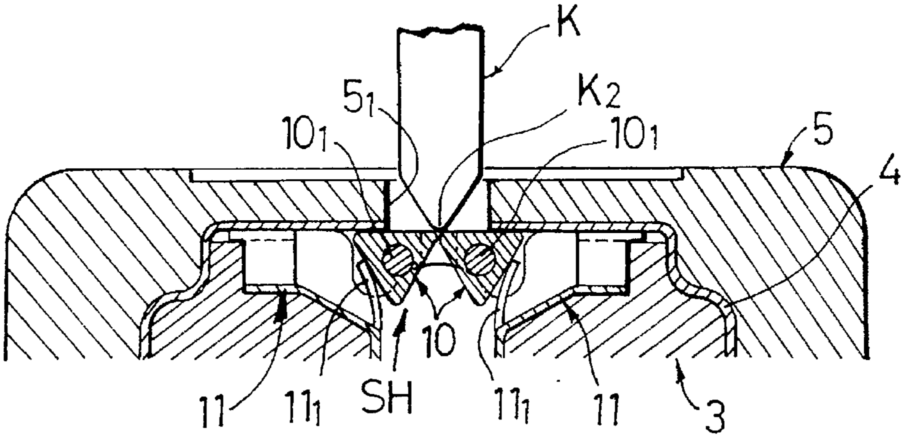
FIG. 6A–6C are views for explaining the operation.
Figure 6B:
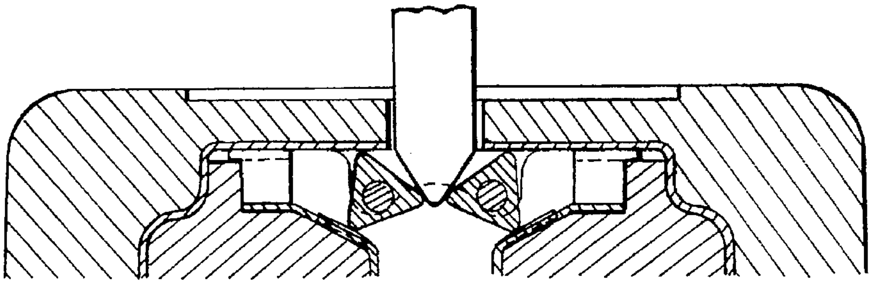

As shown in FIGS. 5 and 6A, the pair of shutter members 10, 10 are normally in abutment against each other to cut communication of the key insertion opening $\mathbf{5}_1$ in the cylinder cap 5 with the key hole $\mathbf{3}_1$. If the tip end $K_2$ of the key K has been inserted from this state into the key insertion opening $\mathbf{5}_1$, the pair of shutter members 10, 10 which have the guide pins $\mathbf{10}_1$ guided on the guide surfaces $\mathbf{3}_2$ are moved away from each other while being turned, thereby permitting the tip end $K_2$ of the key K to be introduced into the key hole $\mathbf{3}_1$, as shown in FIGS. 6B and 6C.

In this way, the shutter members 10, 10 for closing the key hole $\mathbf{3}_1$ are provided as two members and therefore, it is possible to reduce the amount of movement of each of the shutter members 10, 10 to provide a reduction in size of the shutter mechanism SH, as compared with a conventional system using a single shutter member. In addition, the triangular prism-shaped shutter members 10, 10 are moved while being turned with the insertion of the key K and therefore, the tip end $K_2$ of the key K can be guided smoothly. Further, as can be seen from the comparison of FIGS. 6A and 6C, a space for insertion of the key K can be defined by rotating the shutter members 10, 10 through 90°, while minimizing the amount of movement of the shutter members 10, 10. This makes it possible to further reduce the size of the shutter mechanism SH.

Figure 6C:
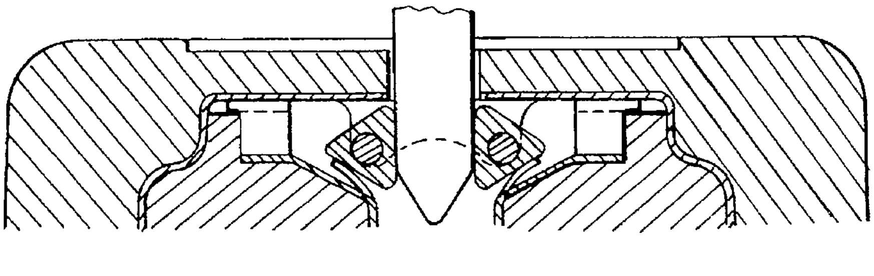

If the key K is withdrawn, the shutter members 10, 10 are further turned through 30° from a state shown in FIG. 6C to a state shown in FIG. 6A. Therefore, every time when the key is inserted, the triangular prism-shaped shutter members 10, 10 are turned through 120° each, so that three outer surfaces constituting the triangular prism alternately close the key hole $\mathbf{3}_1$.

The structure of a steering lock mechanism SL of the key switch for the vehicle will be described below with reference to FIG. 1 and FIGS. 7 to 10.

A slider 13 is slidably fitted in a slider slide groove $\mathbf{1}_3$ provided at a lower portion of the outer cylinder 1, and has a lock pin extending rearwardly of the vehicle. If the slider 13 is retreated while compressing a pair of springs 14, 14 with the rotation of the inner cylinder 2, a protruding lock pin 12 is fitted into a head pipe 15 and a steering shaft 16 in the motorcycle, thereby locking a steering device.

The inner cylinder 2 and the slider 13 are interconnected in a following manner. A cylinder shaft 17 having a diameter smaller than that of the inner cylinder 2 is formed coaxially and integrally at a lower portion of the inner cylinder 2. Chamfers $\mathbf{17}_1$, $\mathbf{17}_1$ are provided around an outer periphery of the cylinder shaft 17 (see FIG. 9 and 10), and a cylinder guide body 18 is relatively non-rotatably and axially movably fitted over the cylinder shaft 17. The cylinder guide body 18 is biased upwardly by a spring 19 to abut against a lower surface of the inner cylinder 2.

The cylinder guide body 18 has an angled cam groove $\mathbf{18}_1$ provided in a front surface thereof, and a guide pin 20 is fitted in the cam groove $\mathbf{18}_1$ and fixed in a rearwardly turned attitude to the outer cylinder 1. Thus, when the inner cylinder 2 is turned, the cylinder guide body 18 is turned in unison with the inner cylinder 2 and the cam groove $\mathbf{18}_1$ is guided by the fixed guide pin 20, thereby causing the cylinder guide body 18 to be axially moved along with the inner cylinder 2.

Figure 8:
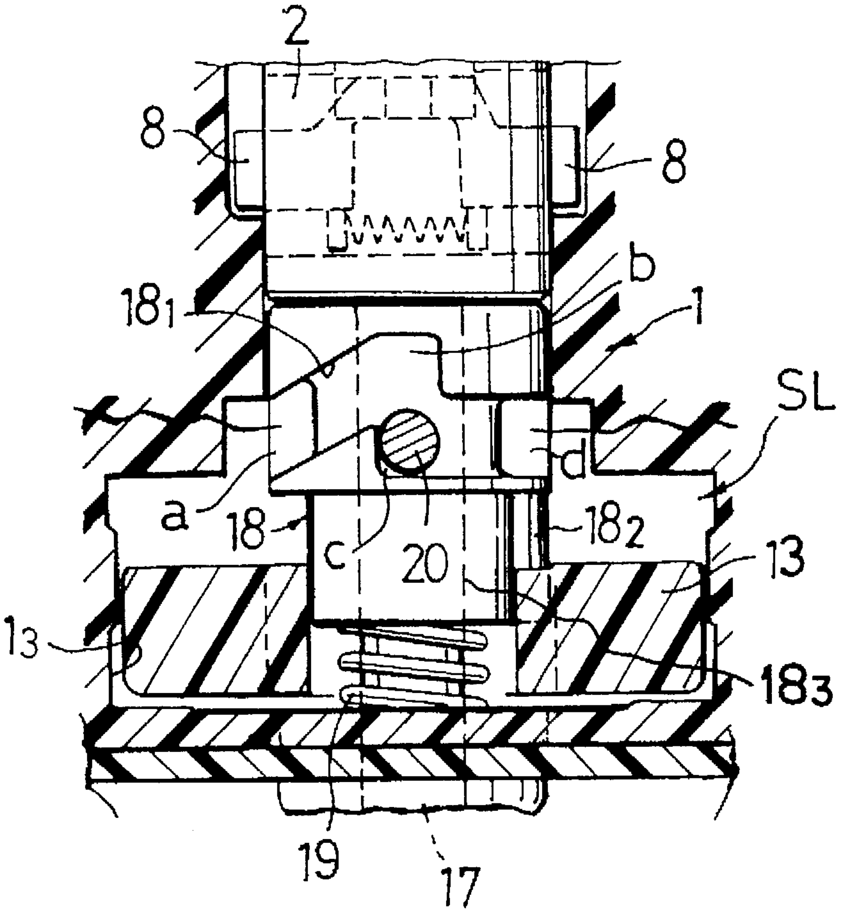

This will be described in detail with reference to FIG. 8. When the inner cylinder 2 is in a locking position which is an end of movement in a counterclockwise direction, the guide pin 20 is in a fitted state at a position a in the cam groove $\mathbf{18}_1$ in the cylinder guide body 18. When the inner cylinder 2 is turned from this state in a clockwise direction using the key K, the cylinder guide body 18 with the cam groove $\mathbf{18}_1$ guided by the guide pin 20 is lowered against a resilient force of the spring 19. When the guide pin 20 has reached a position b in the cam groove $\mathbf{18}_1$, the cylinder guide body 18 is lifted by the resilient force of the spring 19 into an OFF-position in which the guide pin 20 is fitted in a position c in the cam groove $\mathbf{18}_1$. When the inner cylinder 2 is further turned from this state in the clockwise direction, the guide pin 20 is fitted into a position d in the cam groove $\mathbf{18}_1$ to assume an ON-position which is an end of rotation of the inner cylinder 2 in the clockwise direction.

On the other hand, when the inner cylinder 2 is turned in the counterclockwise direction from the ON-position which is the end of turning movement of the inner cylinder in the clockwise direction, the guide pin 20 is moved from the position d to the position c to assume the OFF-position. To turn the inner cylinder 2 into the locking position which is an end of turning movement in the counterclockwise direction, the key K may be urged axially to force the inner cylinder 2 and the cylinder guide body 18 against the resilient force of the spring 19, thereby moving the guide pin 20 from the position c to the position b in the cam groove $\mathbf{18}_1$, and then, the inner cylinder may be turned in the counterclockwise direction to move the guide pin 20 to the position a in the cam groove $\mathbf{18}_1$.

The cylinder guide body 18 has a driving projection $\mathbf{18}_2$ and a locking camsurface $\mathbf{18}_3$ formed thereon at a location lower than the cam groove $\mathbf{18}_1$ by one step. The slider 13 includes a follower projection $\mathbf{13}_1$ which is engaged by the projection $\mathbf{18}_2$, and a first and a second locked cam surface $\mathbf{13}_2$ and $\mathbf{13}_3$ which are engaged by the locking cam surface $\mathbf{18}_3$.

Figure 9:
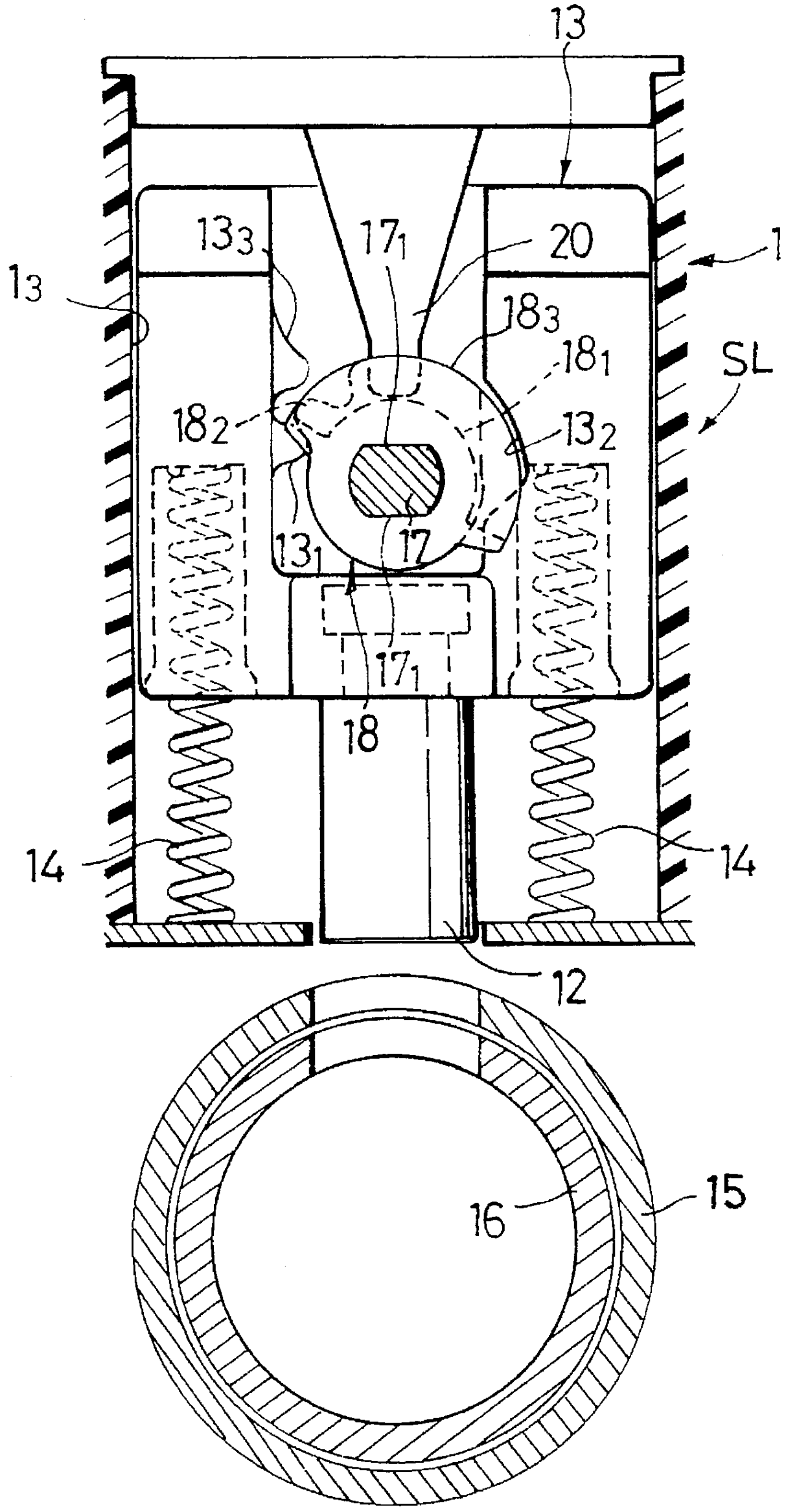
Figure 10:
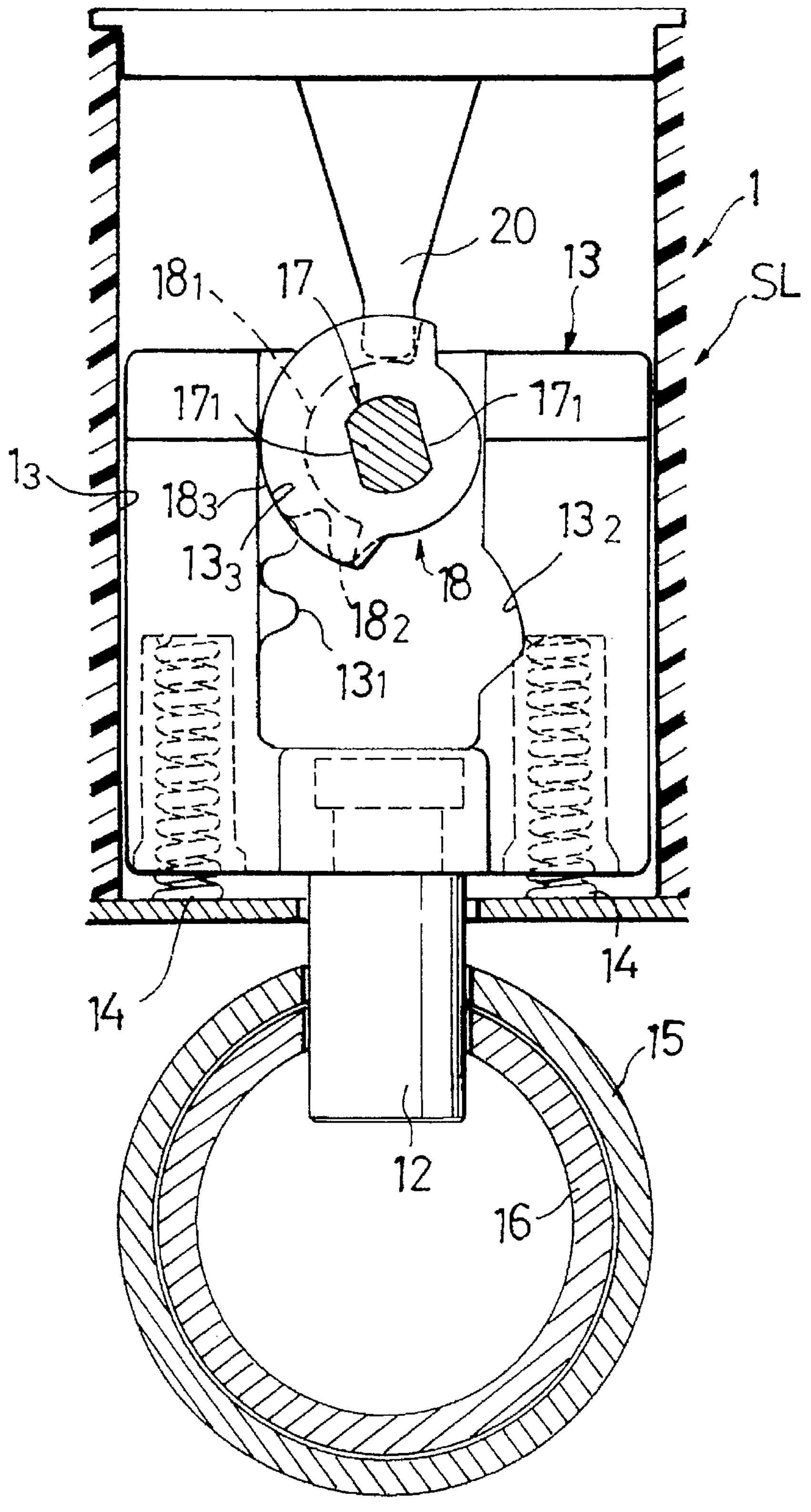

As can be seen from FIG. 9, when the cylinder guide body 18 is turned from the ON-position in the counterclockwise direction to reach the shown OFF-position, the driving projection $\mathbf{18}_2$ of the cylinder guide body 18 is brought into engagement with the follower projection $\mathbf{13}_1$ of the slider 13. When the cylinder guide body 18 is further turned from the OFF-position to the locking position shown in FIG. 10 in the counterclockwise direction, the slider 13 with the follower projection $\mathbf{13}_1$ urged by the driving projection $\mathbf{18}_2$ is slid rearwardly, thereby causing the lock pin 12 to be fitted into the head pipe 15 and the steering shaft 16 to operate a steering lock. During that time, the slider 13 is maintained at a rearward slid position shown in FIG. 10 by engagement of the locking cam surface $\mathbf{18}_3$ with the second locked cam surface $\mathbf{13}_3$ of the slider 13.

Conversely, when the cylinder guide body 18 is turned from the locking position toward the OFF-position in the clockwise direction, the lock pin 12 is moved away from the head pipe 15 and the steering shaft 16 to dislock the steering lock by advancing movement of the slider 13 by the resilient force of the springs 14, 14. During that time, the slider 13 is maintained at a forwardly slid position shown in FIG. 9 by engagement of the locking cam surface $\mathbf{18}_3$ of the cylinder guide body 18 with the first locked cam surface $\mathbf{13}_2$ of the slide 13. The engagement of the locking cam surface $18_3$ of the cylinder guide body 18 with the first locked cam surface $13_2$ of the slider 13 is continued until the cylinder guide body 18 is turned to the ON-position.

As described above, the slider 13 is slid by the engagement of the driving projection $18_2$ of the cylinder guide body 18 with the follower projection $13_1$ of the slider 13, and stopped by the engagement of the locking cam surface $18_3$ of the cylinder guide body 18 with the first locked cam surface $13_2$ and the second locked cam surface $13_3$ of the slider 13. Therefore, the slider 13 can be reliably slid and stopped in a compact structure. Moreover, since the cylinder pins 8, 8 are disposed at locations corresponding to those in which cam means has been provided in the prior art for axially moving the inner cylinder 2 in response to the rotation of the inner cylinder 2, and the guide pin 20 and the cam groove $18_1$ as the cam means are disposed at locations corresponding to those which have been a dead space in the prior art, it is possible to provide a reduction in size of the key switch for the vehicle, despite the provision of the guide pins 8, 8 to increase the rotation restricting force for the inner cylinder 2.

The structure of a switch mechanism SW of the key switch for the vehicle will be described below with reference to FIG. 7 and FIGS. 11 to 14.

Figure 7:
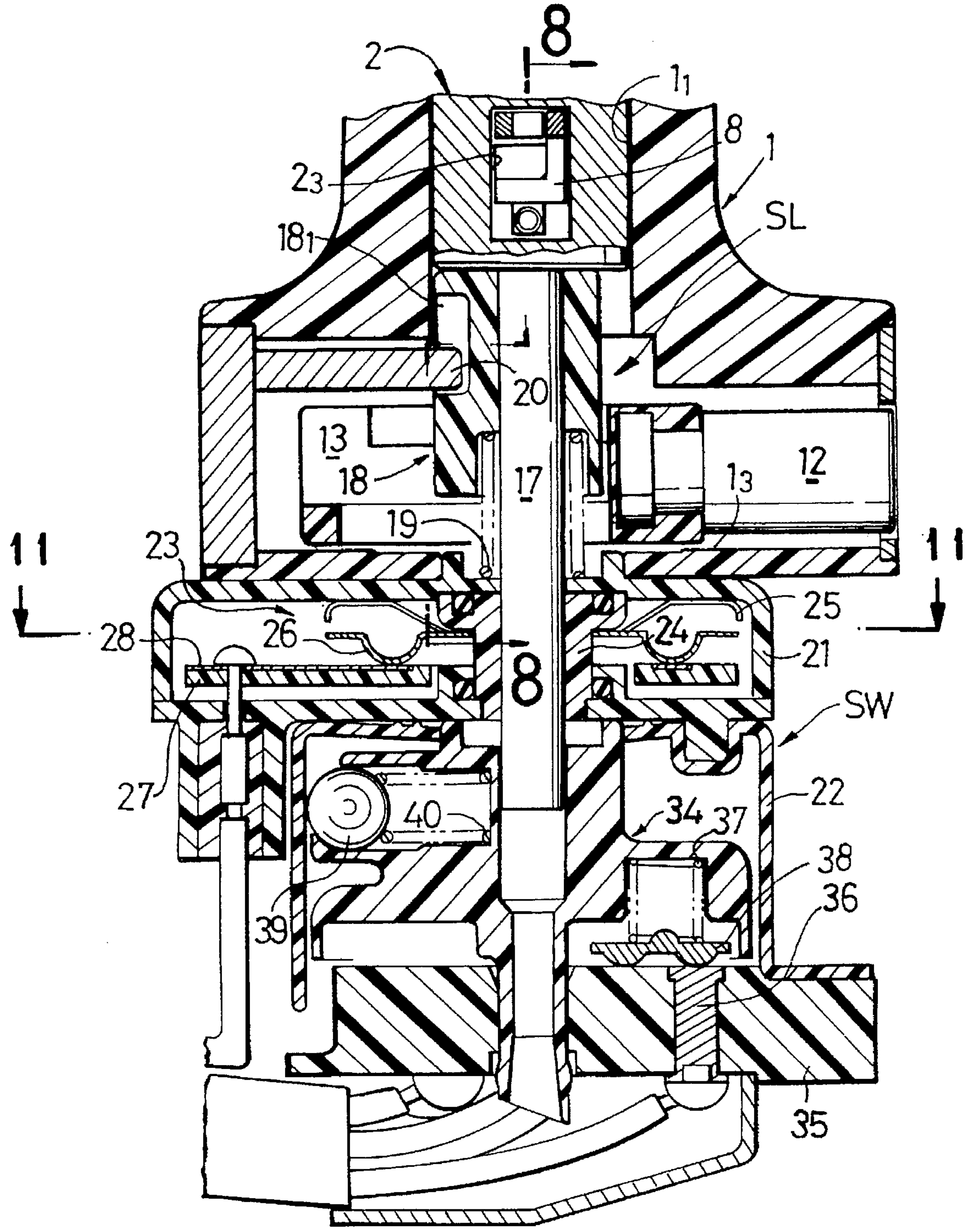

As shown in FIG. 7, the switch mechanism SW is connected to a lower portion of the steering lock mechanism SL, and includes a potentiometer housing 21 and a switch housing 22 through which the cylinder shaft 17 extending downwardly from the inner cylinder 2 is inserted. A potentiometer 23 accommodated within the potentiometer housing 21 includes a boss 24 relatively non-rotatably and axially slidably fitted over the cylinder shaft 17, a movable contact 26 secured to the boss 24 and biased downwardly by a spring 25, a stationary contact holder 27 fixed within the potentiometer housing 21, and a stationary contact 28 which is formed on an upper surface of the stationary contact holder 27 and with which the movable contact 26 comes into sliding contact.

Figure 11:
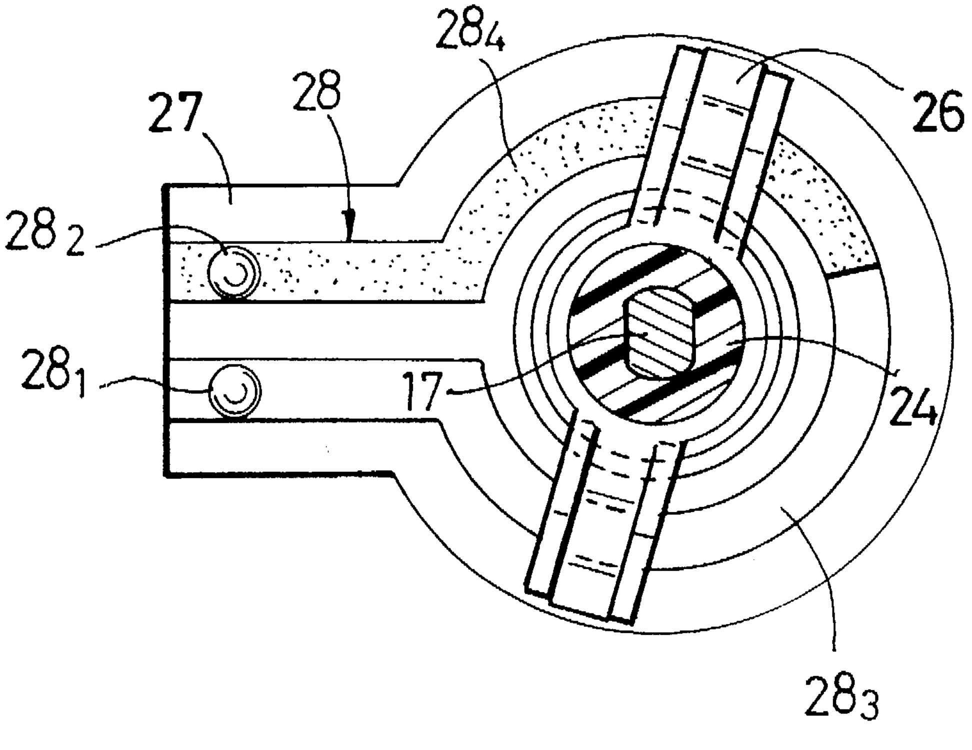

As can be seen from FIG. 11, the stationary contact 28 is formed into a substantially annular shape and has terminals $28_1$ and $28_2$ at opposite ends thereof. One of halves of the stationary contact 28 is formed of a conductor $28_3$, and the other half is formed of an electric resistor $28_4$. The opposite ends of the movable contact 26 are in contact with the conductor $28_3$ and the electric resistor $28_4$ of the stationary contact 28 respectively, so that the electric resistance value between both the terminals $28_1$ and $28_2$ is varied when the movable contact 26 is turned with the rotation of the inner cylinder 2.

Returning to FIG. 7, a movable contact 38 is mounted in a movable contact holder 34 which is accommodated within the switch housing 22 and relatively non-rotatably and axially movably fitted over a lower end of the cylinder shaft 17. The movable contact is biased by a spring 37 in a direction to abut against a stationary contact 36 mounted in a stationary contact holder 35. A click ball 39 is radially movably mounted in the movable contact holder 35 and biased toward an inner peripheral surface of the switch housing 22 by a spring 40. Three recesses (not shown) are provided on the inner peripheral surface of the switch housing 22 to correspond to the three positions, i.e., the locking position, the OFF-position and the ON-position. Thus, the inner cylinder 2 is stopped with moderation at any of the three positions by fitting of the click ball 39 into corresponding one of the recesses.

When the inner cylinder 2 has reached the OFF-position (or a predetermined position between the OFF-position and the ON-position), the movable contact 38 in the movable contact holder 34 is brought into contact with the stationary contact 36 in the stationary contact holder 35 to turn ON a power supply of the vehicle.

Figure 12:
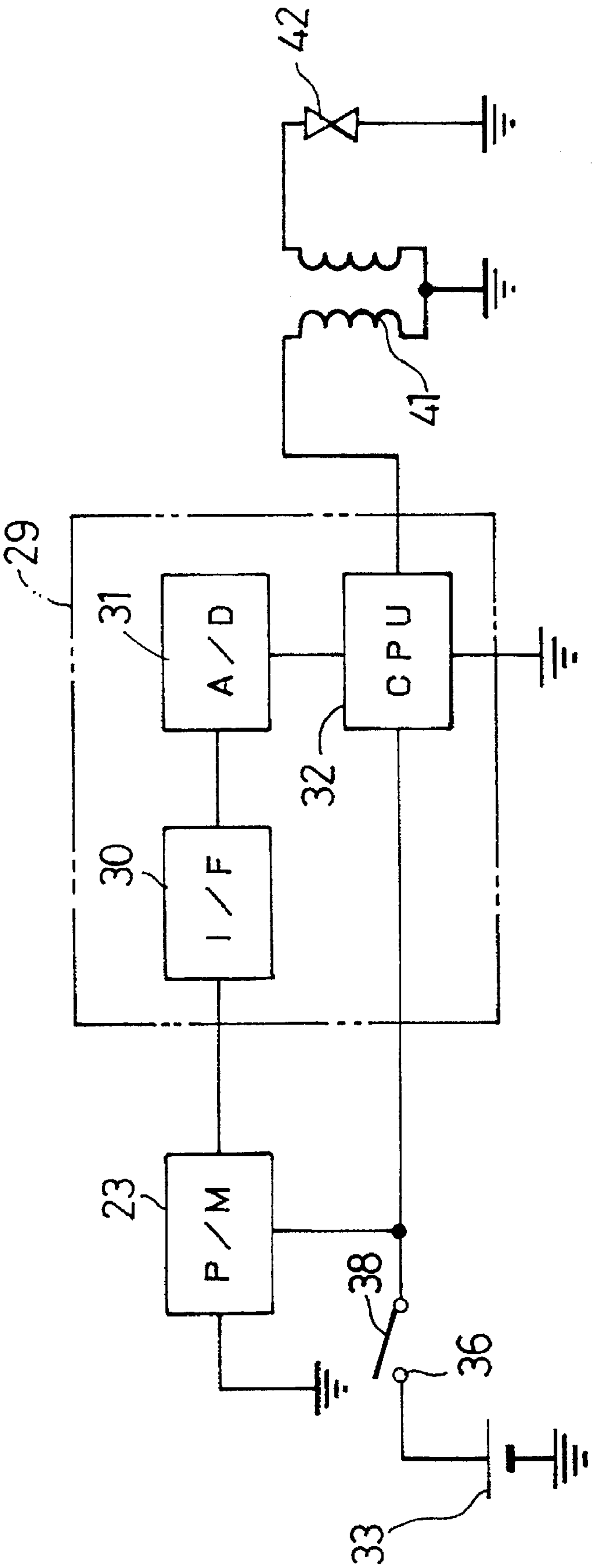

As can be seen from FIG. 12, an ignition circuit 29 for the vehicle , which is operated in operative association with the switch mechanism SW, includes an interface 30, an A/D converter 31 and CPU 32. The stationary contact 36, the movable contact 38, the CPU 32, an ignition coil 41 and a spark plug 42 are connected in series to a battery mounted in the vehicle.

Figures 13A, 13B, 13C, 13D:
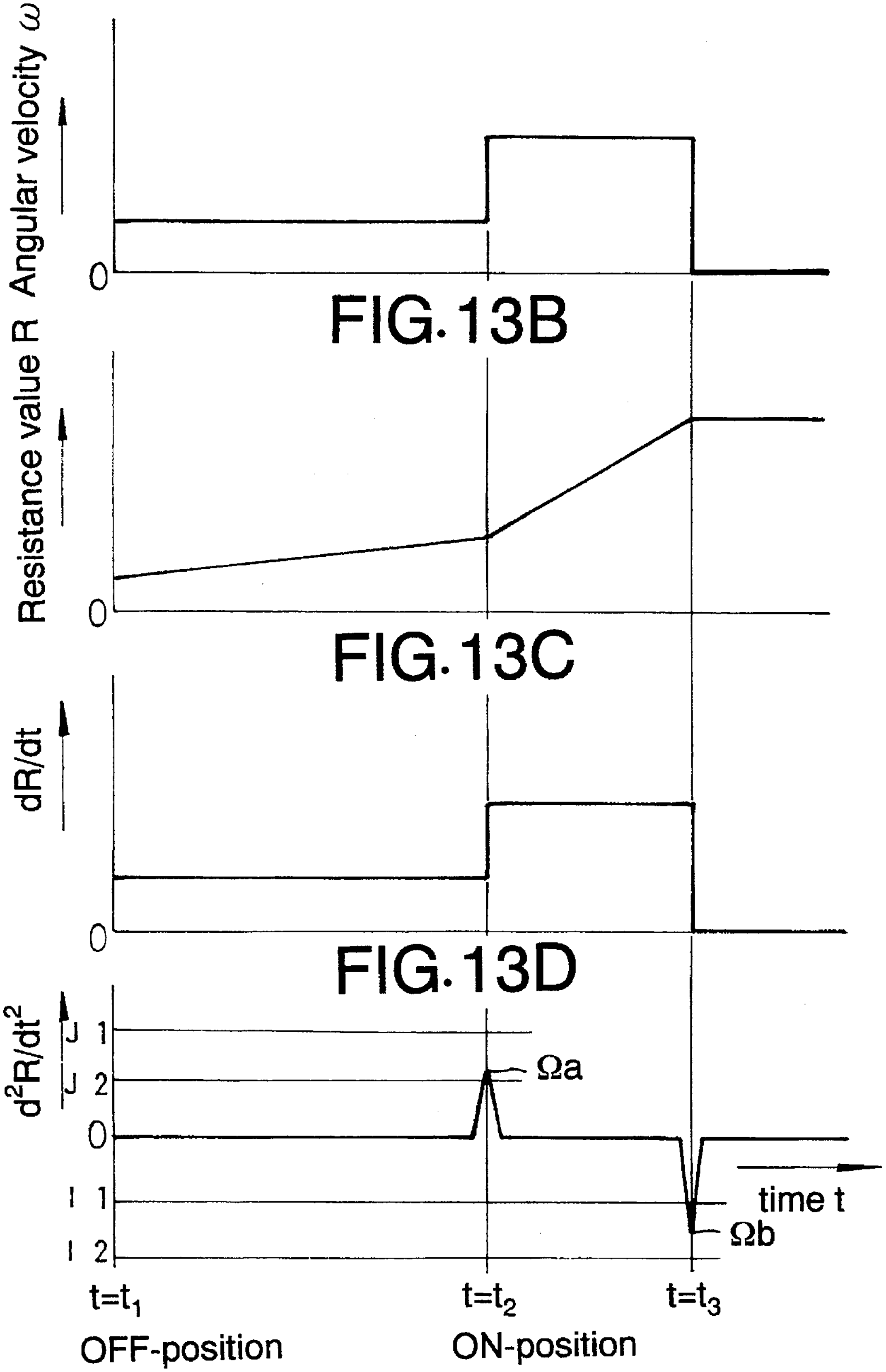
FIGS. 13A–13D are graphs for explaining the operation.
Figure 14:
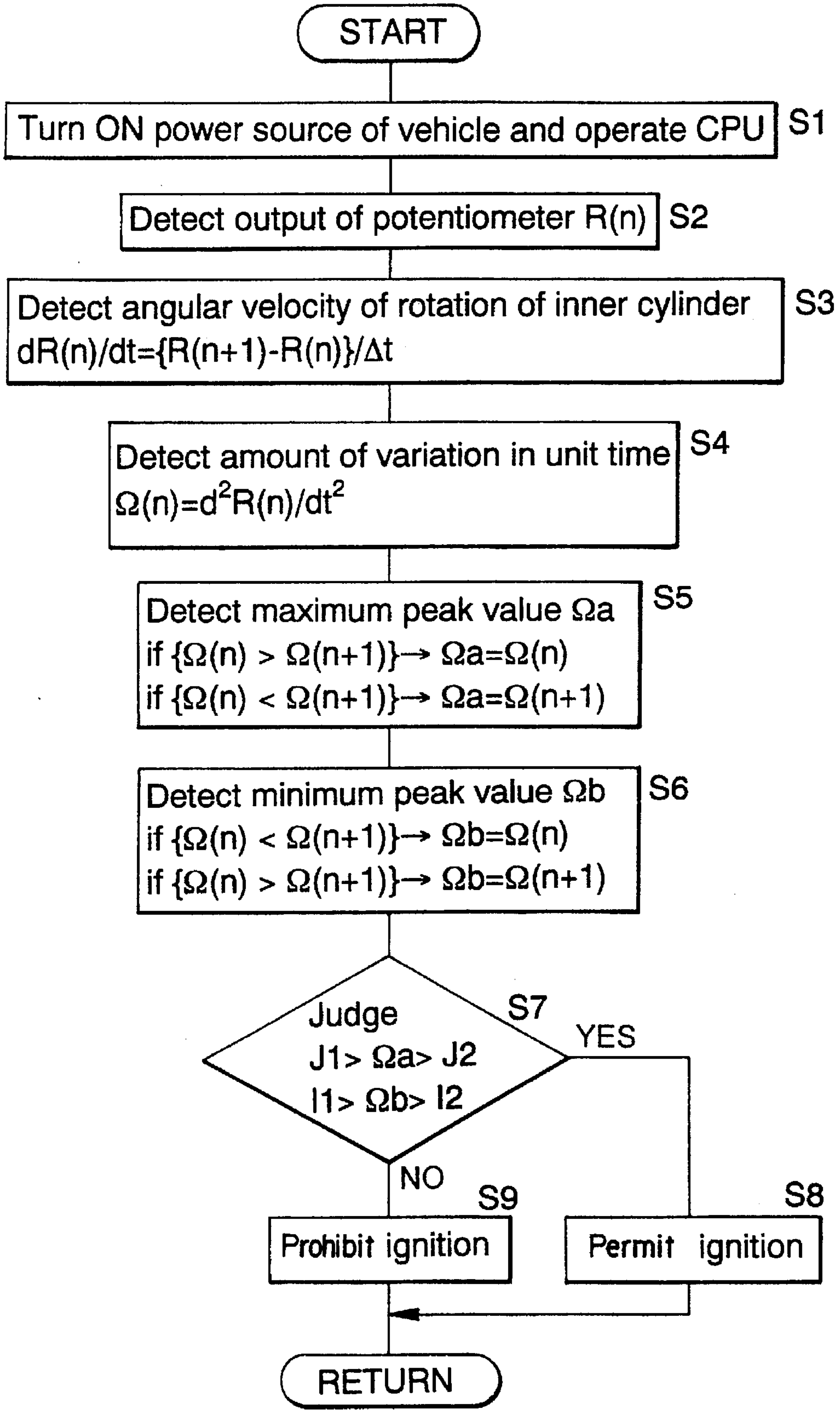
Figure 15:
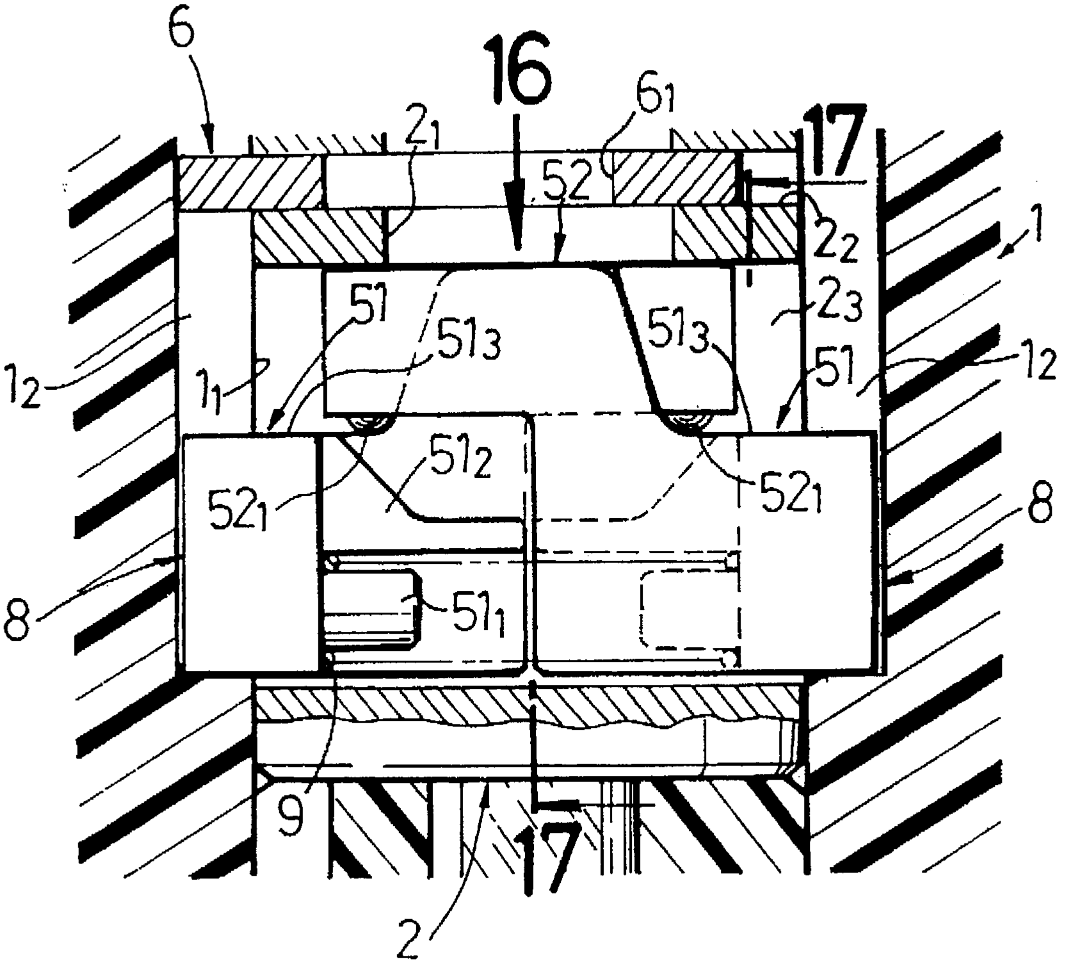

The operation from the rotation of the inner cylinder 2 of the cylinder lock L by the key K to turn ON the power supply of the vehicle to the turning-ON of the ignition circuit 29 will be described below with reference to a graph in FIG. 13 and a flow chart in FIG. 14.

When the inner cylinder 2 is turned to the OFF-position by the key K, the movable contact 38 is brought into contact with the stationary contact 36 to turn ON the power supply of the vehicle (at step S1), and the potentiometer 23 starts the detection (at step S2). When the inner cylinder 2 is turned from the OFF-position to the ON-position, the rotational angular velocity ω of the cylinder shaft 13 is varied as shown in FIG. 13A by the action of the click ball 39 mounted in the movable contact holder 34. Namely, the angular velocity ω is smaller until the inner cylinder 2 is started to be turned from the OFF-position at a time+=$t_1$, and the click ball 39 rides across a crest portion at a time+=$t_2$, but the angular velocity ω is larger from the time $t=t_2$ up to a time $t=t_3$ when the inner cylinder 2 reaches the ON-position, because the cylinder shaft 13 is forcibly turned by the resilient force of the spring 40.

Therefore, as shown in FIG. 13B, the electric resistance value R detected by the potentiometer 23 is slowly increased during a time period of $t_1<t<t_2$ while the angular velocity ω of the inner cylinder 2 is smaller, but the electric resistance value R is quickly increased during a time period of $t_2<t<t_3$ while the angular velocity ω of the inner cylinder 2 is larger. Thus, a linear derived function dR/dt (i.e., the angular velocity of the inner cylinder 2) and a secondary derived function $d^2R/dt^2$ (i.e., an amount Ω of variation per unit time of the angular velocity of the inner cylinder 2) with regard to the time t for the electric resistance value R are as shown in FIGS. 13C and 13D. The linear derived function dR/dt and the secondary derived function $d^2R/dt^2$ are calculated in the CPU 32 (at steps S3 and S4).

Then, a maximum peak value Ω a and a minimum peak value Ω b of the secondary derived function $d_2R/dt^2$ (=Ω) are calculated in the CPU 32 (at steps S5 and S6). It is judged (at step S7) whether or not the maximum peak value Ω a is between reference values J1 and J2 (J1>Ωa>J2) and the minimum peak value Ω b is between reference values I1 and I2 (I1>Ωb>I2). If YES, the ignition is permitted by the CPU 32 (at step S8). If NO, the ignition is prohibited by the CPU 32 (at step S9).

In this manner, the ignition circuit 29 is turned ON based on the rotational angular velocity ω of the inner cylinder, when the cylinder lock L has been normally operated by the key K. Therefore, even if the cylinder lock L is broken down to cause the conduction of the contact, the ignition circuit 29 cannot be turned ON.

A second embodiment of the present invention will now be described with reference to FIGS. 15 to 19.

A pair of cylinder pins 8, 8 are members having the same shape and combined in their attitudes in which they have been turned through 180° with respect to an axis of the cylinder bore $1_1$ in the outer cylinder 1. Each of the cylinder pins 8 includes a pin portion 51 having a rectangular section and engageable in a tumbler engagement groove $1_2$ in the outer cylinder 1, and an engage portion 52 abuttable against the tip end $K_2$ of the key K. The pin portion 51 and the engage portion 52 are spaced apart from each other in a diametrical direction of the cylinder bore $1_1$ and also in an axial direction of the cylinder bore $1_1$, so that the pin portion 51 is located below the engage portion 52.

The pin portion 51 of each of the cylinder pins 8 is formed with a spring supporting portion $51_1$ for supporting opposite ends of the spring 9 for biasing both the cylinder pins 8, 8 away from each other, and a spring guide $51_2$ for guiding the spring 9 such as to cover one side of the spring 9. A semi-spherical slide projection $52_1$ is provided on a lower surface of the engage portion 52 of one of the cylinder pins 8 in sliding contact with a slide surface $51_3$ formed on an upper surface of the pin portion 51 of the other cylinder pin 8, whereby the pair of cylinder pins 8, 8 can be slid along a cylinder pin slide groove $2_3$ in the inner cylinder 2 without being inclined relative to each other.

Figure 16A:
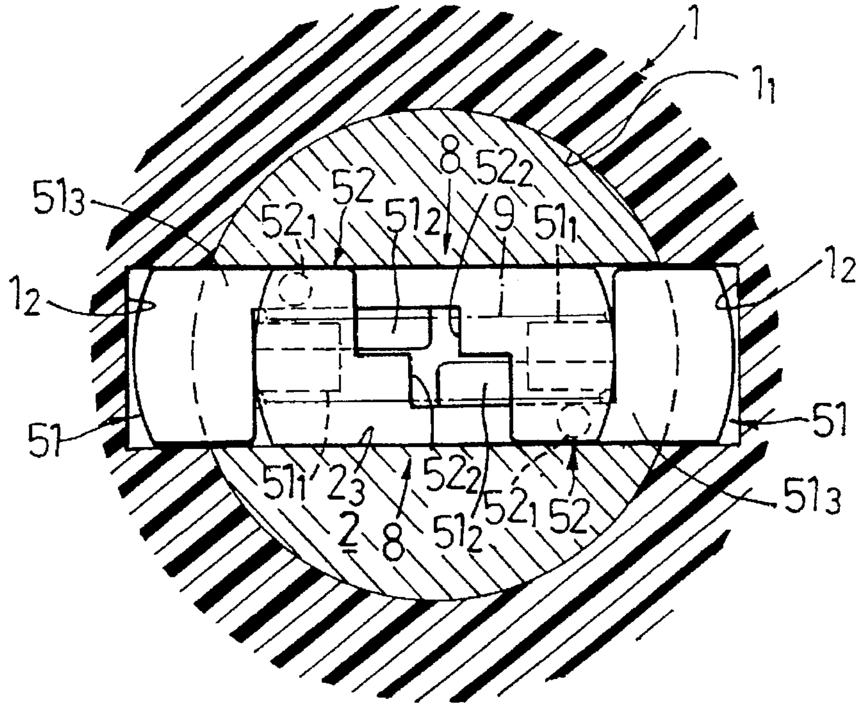
FIG. 16A and 16B are views taken along an arrow 16 in FIG. 15.
Figure 16B:
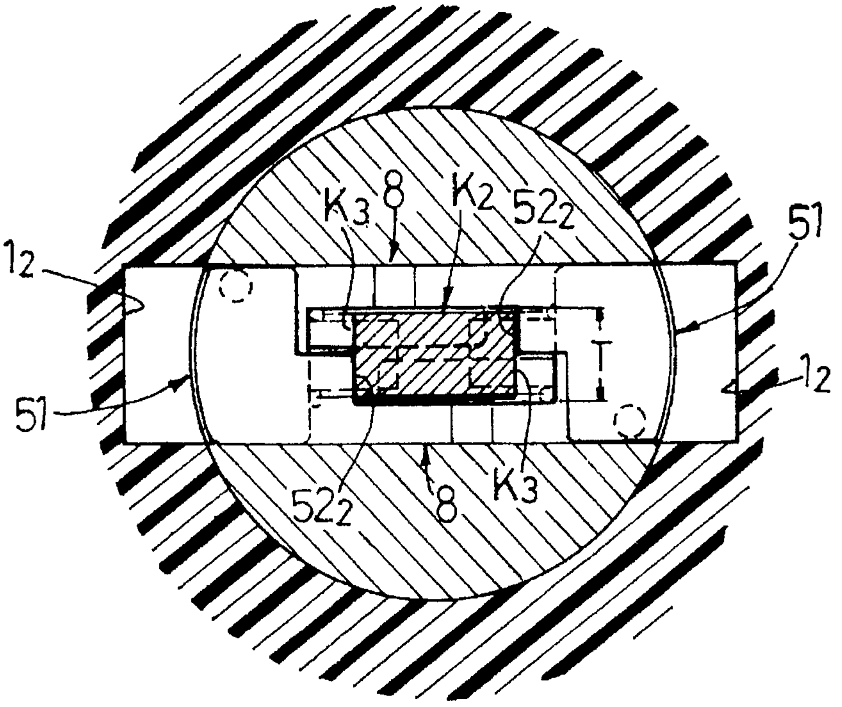
Figure 17:
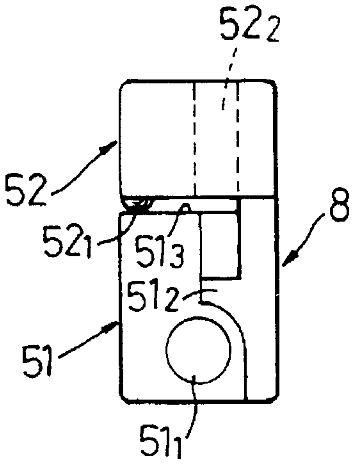
Figure 18:
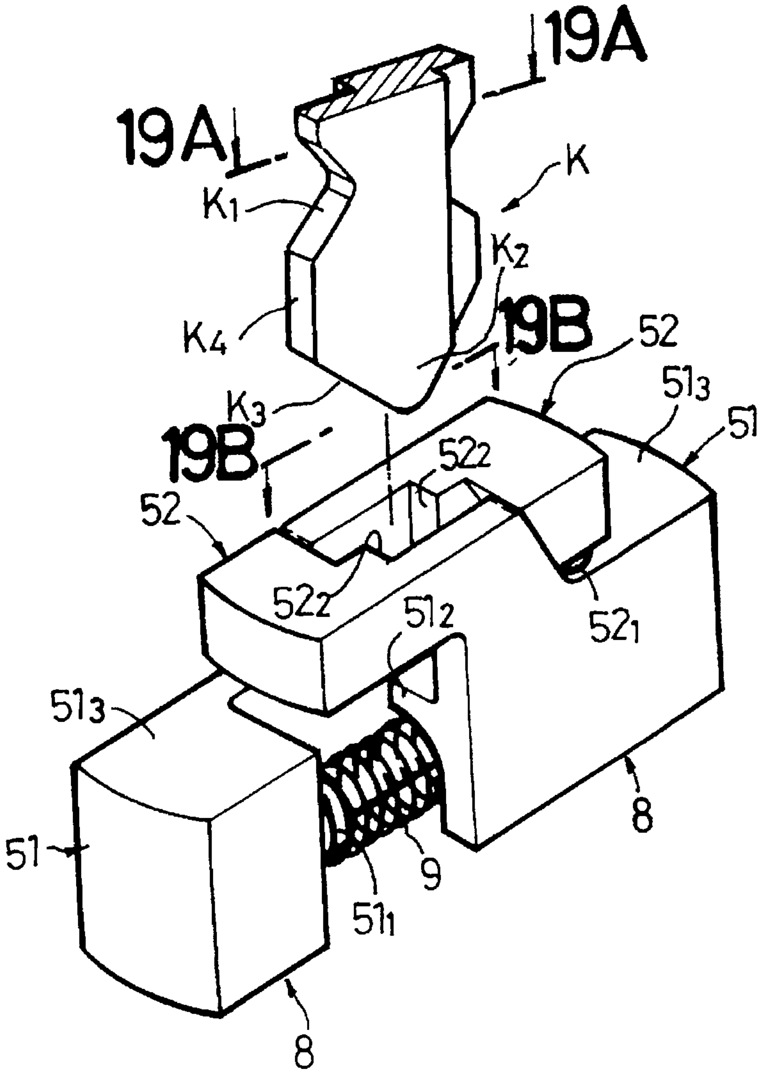
Figure 19A:
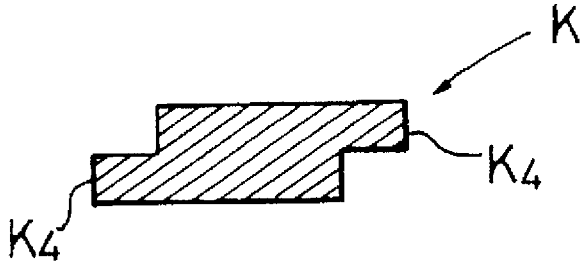
FIGS. 19A and 19B are sectional views taken along a line 19A—19A and a line 19B—19B in FIG. 18, respectively.
Figure 19B:
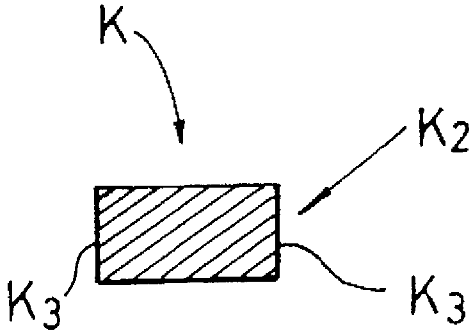

The engage portion 52 of each of the cylinder pins 8 includes a stepped key engage surface $52_2$. The key engage surface $52_2$ comes into sliding contact with both of an inclined surface $K_3$ formed at the tip end $K_2$ of the key K and an end wall surface $K_4$ connected to the inclined surface $K_3$, so that the pair of cylinder pins 8, 8 are urged by the inclined surface $K_3$ and the end wall surface $K_4$ with the insertion of the key K to move the pin portions 51, 51 away from the tumbler engagement grooves $1_2$, $1_2$ from positions of FIG. 16A via positions of FIG. 16B. During that time, the key engage surface $52_2$ of each of the cylinder pins 8 is in sliding contact with a portion of the inclined surface $K_3$ of the key K corresponding to about one half of the thickness T thereof, as can be seen from FIG. 16B and hence, it is possible to reduce the wear of the tip end $K_2$ of the key K, as compared with a system in which the key engage surface $52_2$ is in sliding contact with the entire inclined surface $K_3$, thereby effectively preserving the tip end $K_2$ for positioning of the key K in a lock for a tank cap and a lock for a seat provided in a motorcycle or the like. It should be noted that a portion shown in section in FIG. 16B is a section of the tip end $K_2$ of the key K shown in FIG. 19B.

Although the embodiments of the present invention have been described in detail, it will be understood that the present invention is not limited to the above-described embodiments, and various modifications in design may be made without departing from the spirit and scope of the invention defined in claims.

For example, although the key switch system for the motorcycle has been exemplified in the embodiments, the present invention is applicable to a key switch system for an automotive vehicle.

What is claimed is:

1. A key switch system for a vehicle, comprising:

a cylinder lock comprised of an outer cylinder formed in its inner peripheral surface with axially-extending tumbler engagement grooves, an inner cylinder rotatably carried on the inner peripheral surface of the outer cylinder and having an axially extending key hole, and a plurality of tumblers radially slidably carried in the inner cylinder and capable of being engaged into said tumbler engagement grooves in the outer cylinder and disengaged from the tumbler engagement grooves by the insertion of a key into the key hole;

a steering lock mechanism operated in operative association with the rotation of the inner cylinder of said cylinder lock to lock a steering device; and a switch mechanism operated in operative association with the rotation of said inner cylinder of said cylinder lock to turn ON an ignition circuit; wherein said system further includes a pair of cylinder pins which are radially slidably carried in said inner cylinder to engage different ones Of said tumbler engagement grooves in said outer cylinder and having a rigidity higher than that of said tumblers, wherein said cylinder pins are disengaged from said tumbler engagement grooves by a tip end of the key coming into abutment against said cylinder pins when the key is completely inserted into said key hole, and wherein each of said pair of cylinder pins comprises a pin portion which is engageable With a corresponding one of said tumbler engagement grooves, an engage portion for receiving said tip end of the key, and a support portion for supporting a resilient means thereon which urges said pin portion in a direction to engage said corresponding one of the tumbler engagement grooves.

2. A key switch system for a vehicle according to claim 1, wherein said steering lock mechanism includes a lock means advanced and retreated by the rotation of said inner cylinder to lock said steering device, and a cam means for moving said inner cylinder in an axial direction, when said inner cylinder is turned between a locking position and a lock-releasing position, said cam means being disposed between said cylinder pins and said lock means in an axial direction of said inner cylinder.

3. A key switch system for a vehicle according to claim 1, wherein said switch mechanism includes a potentiometer for outputting a resistance value corresponding to the amount of rotation of said inner cylinder, and a control means for turning ON said ignition circuit in response to change in output from said potentiometer with time.

4. A key switch system for a vehicle according to claim 1, wherein said engage portions of the cylinder pins are formed so as to cause the pin portions to come close to each other against the resilient force of said resilient means when the tip end of the key is urged against the engage portions.

* * * * *